United States Patent [19]

Braun

[11] Patent Number: 4,898,565

[45] Date of Patent: Feb. 6, 1990

[54] DIRECTION SENSING APPARATUS FOR DATA TRANSMISSION CABLE CONNECTIONS

[75] Inventor: Steve W. Braun, San Diego, Calif.

[73] Assignee: Honeywell Inc., Minneapolis, Minn.

[21] Appl. No.: 668,679

[22] Filed: Nov. 5, 1984

Related U.S. Application Data

[63] Continuation of Ser. No. 428,009, Sep. 29, 1982, abandoned.

[51] Int. Cl.$^4$ ............................................. H04B 9/00
[52] U.S. Cl. ................................... 455/612; 455/601; 455/607
[58] Field of Search ...................... 375/3, 36; 455/601, 455/606, 607, 612; 340/825.03, 825.05; 370/75, 90, 97

[56] References Cited

U.S. PATENT DOCUMENTS 4,408,307 10/1983 Harris .................................. 455/606

Primary Examiner—Benedict V. Safourek
Assistant Examiner—L. Van Beek
Attorney, Agent, or Firm—W. T. Udseth

[57] ABSTRACT

Disclosed is a direction sensing apparatus employed with universal connectors at the data units located along a data transmission cable. Each connector includes an optical source and an optical detector and the connecting segments cable between units each includes two fiberoptic conduits. One is for the transmission of control signals in a direction away from a master station and the other is for the transmission of the data signals toward the master station. Logic circuitry within each unit determines the presence of the first light source detected at the unit and switches the signals modulated thereon to the command channel within the unit. This switching also applies the signals modulated on the second-in-time light source detected at the unit to be applied to the data channel within the unit. Hence, it makes no difference which of the two connections at each data unit is used for connecting with the preceding station or with the succeeding station.

10 Claims, 2 Drawing Sheets

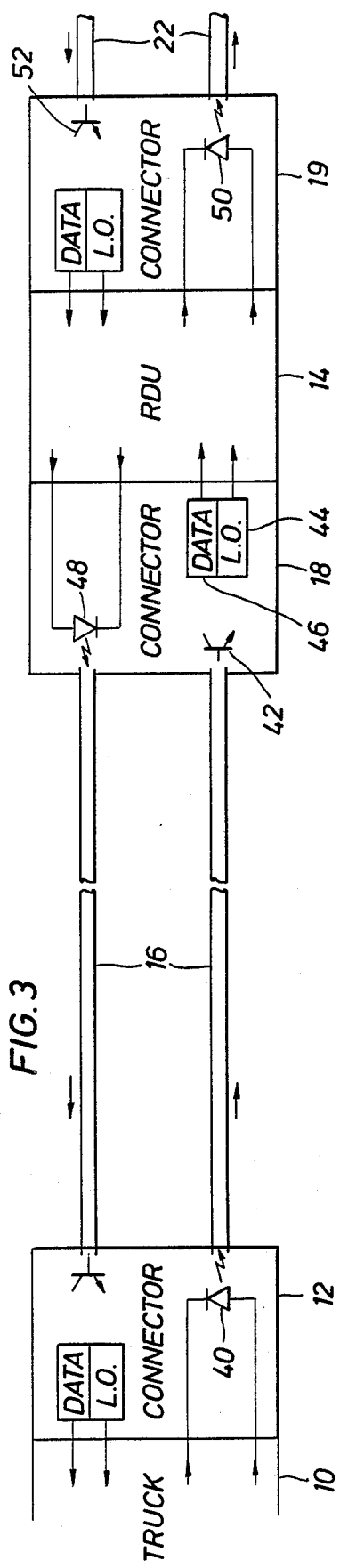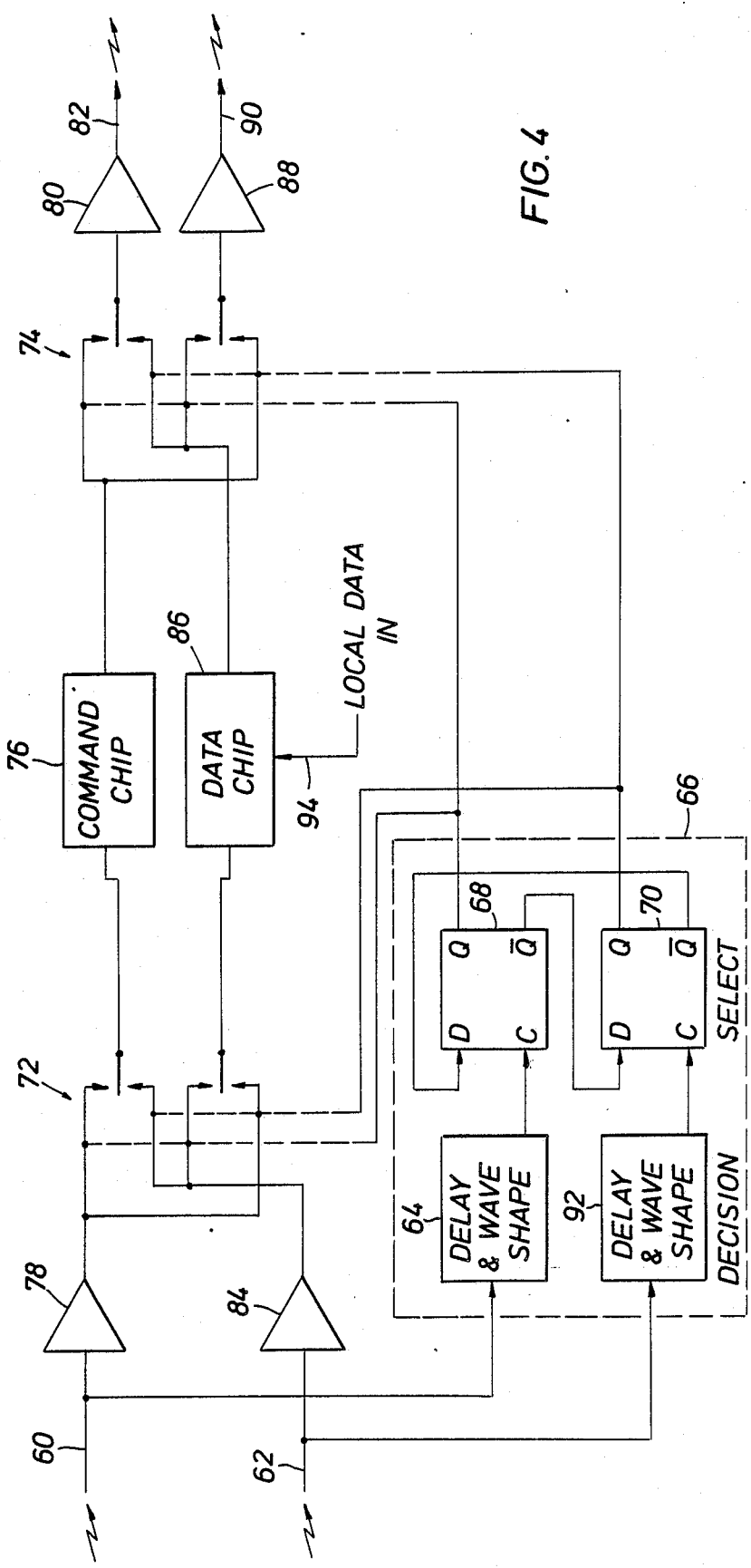

DIRECTION SENSING APPARATUS FOR DATA TRANSMISSION CABLE CONNECTIONS

This application is a continuation of application Ser. No. 428,009 filed Sept. 29, 1982, now abandoned.

BACKGROUND OF THE INVENTION

Description of the Prior Art

Remote data units connected in the field along the path of a seismic data cable can have two separate types of connectors so that the cable connections thereto cannot be mixed up. That is, one connector of the data unit can be suitable for connection to the downstream connector of a cable segment arriving from the upstream side of the data unit and the other connection of the data unit can be suitable for connection to the upstream connector of a cable segment to be strung downstream to the next subsequent data unit.

However, it is not uncommon for the cables to be laid out prior to any connections or to be laid out by more than one person or crew from two or more different starting locations. When this happens using data units and cable segments having upstream and downstream connectors that differ from each other, it is frustrating to find out that one or more of the cable segments have been strung out in reverse for proper connection. Since a single cable segment between data units in many cases is over 100 yards long, it is not only frustrating, but it is also time consuming, and therefore expensive, to take up and re-lay cable segments that are originally incorrectly aligned. In some cases, the terrain also is rugged or otherwise difficult for the field personnel. Unnecessary cable manipulations are to be avoided if at all possible.

Therefore, it is desirable to have cable segments and remote data units that have universal connectors which cannot be mixed up. In such a case, it does not matter how the cables are oriented as far as their ends are concerned or how the cable segments are connected into the remote data units. The only problem is that the control or command signals from the master station, usually a seismic control and recording installation located in a tent or a truck, are designed to progress in one direction and the data signals transmitted from the data units to the master station are generally designed to progress in the opposite direction. Therefore, the universal connections have to have some provision for ensuring the proper direction alignment for the control and data signals. Means heretofore available for such purpose have been complex, unreliable and have generally required additional control operations. This adds to the difficulty, expense and reliability of data collection, which by its nature suffers enough from these difficulties.

Fiberoptics have had many uses where it is desirable to direct light along a path that may have turns on deviations from a straight line. The present invention utilizes fiberoptics in a unique application for ensuring that universal connections are properly made vis-a-vis the control and data paths through the remote data units in a seismic data cable connection system.

Therefore, it is a feature of the present invention to provide improved direction sensing apparatus in connection with a plurality of data stations and connecting cable connecting segments, each of the station and the cable segments having universal connectors.

It is another feature of the present invention to provide an improved direction sensing apparatus in a cable system having intermediate stations therealong, one end of which is connected to a master station, using fiberoptics within the cable system and light sources and detectors as the means for ensuring proper connections.

SUMMARY OF THE INVENTION

The direction sensing apparatus of the present invention is employed in conjunction with data and control cable segments, a master station, and a plurality of spaced apart data stations located along a data path and interconnected by the cable segments. Each of the cable segments and each of the data stations have universal connections so that either connector on a data unit can receive the connector located on either end of a cable segment. In addition, the master station has such a universal connector.

Each connector in the data units includes a light source and an independently operable light detector, such as an optocoupled diode. The connector of the master station includes at least a light source. Each of the cable segments includes an optical path therein in the form of a fiberoptic conduit or cable. Prior to light transmission from a source, meaningful information is modulated on a carrier. Thus, the light transmitted from the master station to the first remote unit includes control or command information modulated thereon. These light modulations are readily converted to electrical signals within the remote data units by means well known in the art.

The connection of the master station to the first data station using a length or segment of cable of the form just described results in the detection of the master station source by a detector at the data station. This detection produces two functions. First, the detector diode or equivalent component resistance is lowered, thereby providing current flow in a logic network including such diode and ensuring that the control information signals and data information signals (transmitted by way of modulated light sources on a separate return path) of the unit are directed through the unit in their respectively proper directions. In addition, the source in the opposite connector of the unit from that used to connect with the master station is enabled to produce control light to the next remote data unit via the fiberoptic conduit in the next subsequent cable segment.

Such operational connections continue from one data unit to the next until all of the units are connected together to form a complete cable connected control and data system.

Had the connections at the data unit been reversed, the control signal path would have been connected by the enabling logic means within the data unit in the opposite direction. Furthermore, the opposite light source within the unit would have been enabled for operating in conjunction with the next downstream data unit.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had the reference to the embodiment thereof which is illustrated in the appended drawings, which drawings form a part of this specification. It is to be noted, however, that the appended drawings illustrate only a preferred embodiment of the invention and are therefore not to be considered limiting of its scope, for the invention may admit to other equally effective embodiments.

In the Drawings:

FIG. 3 is a simplified block diagram of the source and detector of the system shown in FIG. 1.

FIG. 4 is a simplified schematic and block diagram of the logic and switching networks for the control and data channels within a single remote data unit.

DESCRIPTION OF THE PREFERRED EMBODIMENTS

Figure 1:
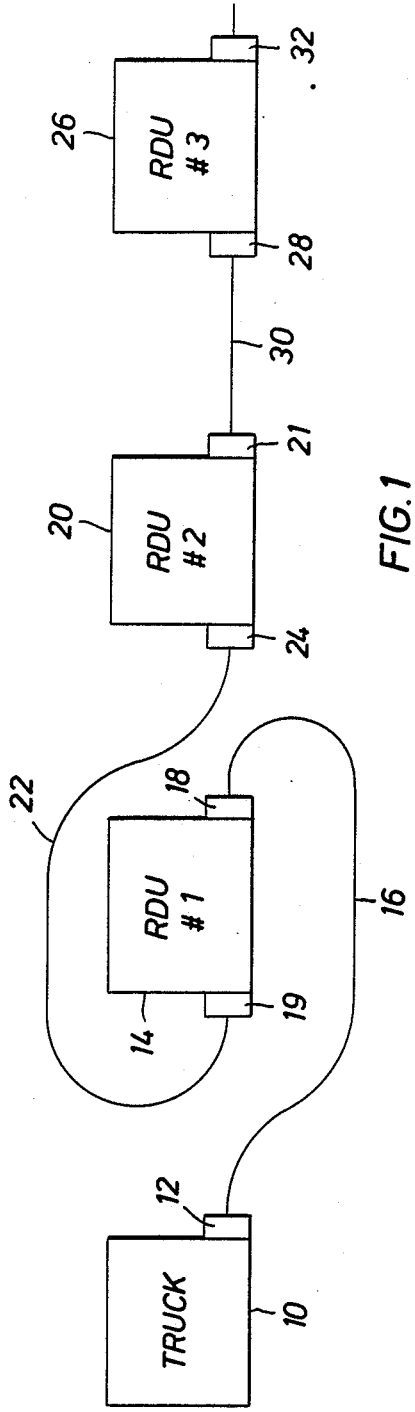
FIG. 1 is a simplified cable connection diagram of the direction sensing apparatus in accordance with this invention.

Now referring to FIG. 1, a simplified cable connection diagram is illustrated in accordance with the present invention. For simplicity, the master station for the data system is illustrated as truck 10 and includes a universal connector 12 for connecting to a cable segment 16. Remote data unit number 1 (RDU#1) 14 is located at the first data unit location closest to truck 10. RDU#1 14 is connected to the other end connector of cable segment 16 at one of its two universal connectors 18.

In subsequent order, the other universal connector 19 of RDU#1 14 is connected via cable segment 22 to universal connector 24 of RDU#2 20 and the other universal connector 21 of RDU#2 20 is connected via cable segment 30 to universal connector 28 of RDU#3 26. RDU#3 has a universal connector 32 which is used for making a subsequent cable connection in a manner similar to those just described.

Figure 2:
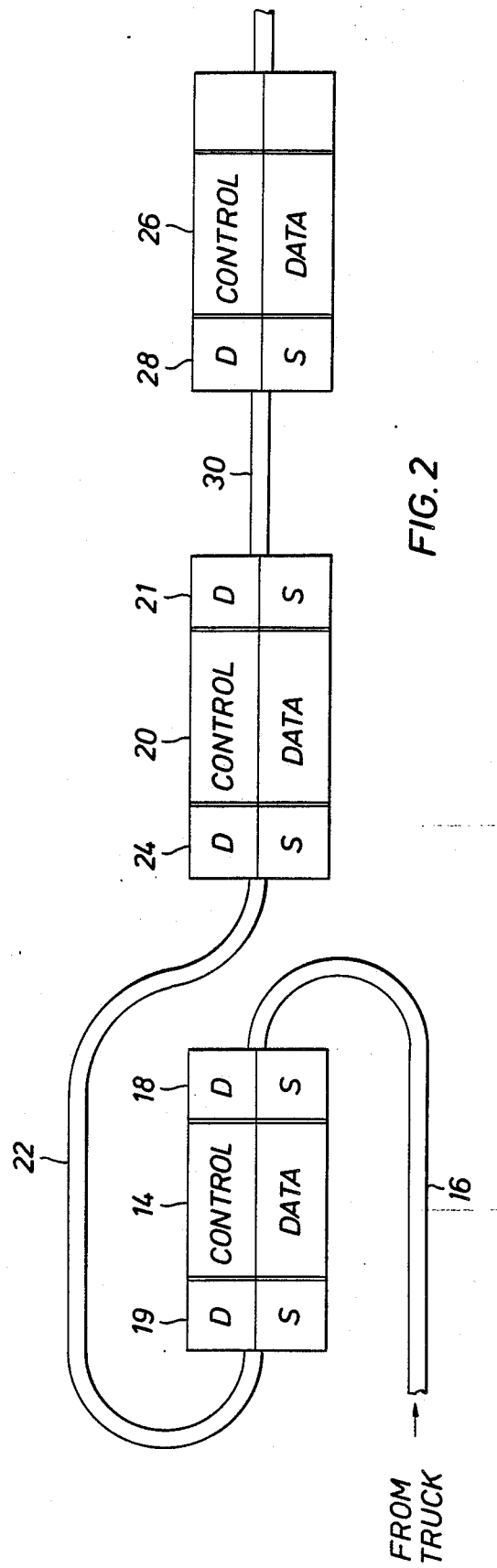
FIG. 2 is a simplified functional diagram showing some of the operational details of the connections illustrated generally in FIG. 1.

The two connectors of a remote data unit in the field will be randomly oriented but, in accordance with this invention, it makes no difference whether the cable segment coming from the master station or from the next remote data unit is connected to one or the other as it is located in its position. This is illustrated by the cables being shown the in the snake configurations in FIG. 1 and in FIG. 2.

Each of the connectors associated with a data unit includes a light detector and a light source. This is also true of connector 12, which is associated with truck 10. Typically, a light source is in the form of a light emitting diode (LED) and a detector includes a light sensitive or optocoupled diode in a network that is sensitive to a change of resistance of the diode in the presence of light.

Also for convenience, each remote unit includes a control network section or channel and a data network section or channel. A control section operates in conjunction with the control signals. For the first data unit, the control signals are initiated at the master station. For the subsequent data units, the control signals come from the respectively preceding data units. Preferably the control signals carry the control or command information in a modulation superimposed on a carrier. Within the master unit and the data units, the desirable modulation occurs electronically. The resulting electronic signals are then respectively converted to modulated light transmission using means well known in the art.

The data section operates with the data signals that are created at the remote unit and at the more remote data units and are transmitted back to the master station for recording and interpretive purposes in a manner similar to the procedure used in creating the command signals.

Although there are numerous data gathering and transmission schemes and different data control and collection techniques, local control signals are established in the individual data units of some systems that travel in the reverse direction from that just described for control signals. All of the signals, however, have a preferred direction of travel through a data unit and the present direction sensing system ensures that all of the directions of path travel are correct, independently of the path schemes for a particular system. For simplicity of discussion, it is assumed that control or command information signals generally travel in a direction away from the master station or truck 10 and the data information signals generally travel in a direction toward the master station or truck 10.

Each of cable segments 16, 22, 30 and the like include at least two fiberoptic conduits therein. One conduit is for carrying the master information signals in the manner just described and the other conduit is for carrying the data information signals. A connection from master station or truck 10 to RDU#1 14 via cable 16 will connect a fiberoptic conduit from the source in connector 12 so that it illuminates the detector in connector 18 (or, alternatively in connector 19 if cable segment 16 happened to be connected to connector 19). The detection of the presence of light by the detector causes the network in which that detector is located to enable the logic components located within the remote data unit so that the control signals and the data signals are oriented to pass through the unit in their respectively proper directions. For example, the control signals normally will progress from truck 10 in the direction of the least remote data units to the more remote data units and the data signals will progress from the more remote data units to the master station for recording purposes. Of course, as mentioned above, there are control signals and data signals that may operate in the reverse direction in some instances depending upon the particular system that is employed. The connection scheme of the present invention, however, is such that regardless of what scheme is employed by the particular data units, the control signals and the data signals will be properly aligned for operational purposes.

Once the control or command fiberoptic conduit is established for a cable segment, then the remaining fiberoptic conduit is dedicated for carrying the data information signals in a manner similar to that just described.

In addition to enabling the remote unit so that the control and data signals flow in the respectively correct directions, the source in the opposite connector from that which is connected to the master unit (in the example illustrated, connector 19) is enabled so as to direct its control signal light emanations via a fiberoptic conduit in cable 22 to be detected by a detector that is located in connector 24 of remote unit 20.

The detection of the light source in connector 24 causes a similar function in remote unit 20 to that which has just been described for the detection of light by the one of the connectors of unit 14. THat is, the control and data signals are directed by logic means in data unit 20 so as to flow in their respective proper directions and so as to enable the source located in connector 21, which is the connector remote or opposite from the control-signal enabled detector. In similar fashion, the detectors operate and direct the control and data signals through unit 26 and enable the opposite source from the detector detecting the control signals for subsequent system operation.

Now turning to FIGS. 3 and 4, it is possible to take a closer look at the happenings of the signal path determination. For convenience, the master station truck 10 and the first remote data unit 14 are illustrated with their respective connectors shown in simplified form in FIG. 3. FIG. 4 illustrates the logic and sequence action occurring within a remote data unit.

Connector 12 includes an optical diode 40 or other similar light-emitting source. It is connected to electronics within truck 10. As mentioned above, the control or command signals are applied to diode 40, where the electric impulses applied thereto are converted to light. The light is transmitted via one of the fiberoptic conduits of cable 16 to be detected by a suitable detector 42, drawn as a transistor, in connector 18. The detected light is converted to electrical impulses and are applied to a so-called light output portion 44 and a data portion 46 for producing separate signals to the RDU. As explained below, the RDU includes switching means for eventually enabling optical diode 48 in connector 18 for data transmission back to connector 12 of truck 10 and for enabling optical diode 50 of connector 19 for transmitting control or command signals on one of the fiberoptic conduits of cable 22 connected to the second remote data unit (not shown in FIG. 3). At the same time, detector 52 in connector 19 is enabled for receiving data signals back on the other fiberoptic conduit of cable 22 from the second data unit.

FIG. 4 shows that there are electrical signals 60 and 62 from the two optical detectors at each remote data unit. For example, a signal is detected by detector 42 and another signal is detected by detector 52 of RDU 14. One signal includes the control information and is the first to be received by the unit. The other signal includes the data information and is the second to be received by the unit.

Assuming that the control information is received on line 60, it is connected to a delay and waveshaping network 64 located within the decision select portion 66 of the RDU. This circuit receives the high frequency modulation and produces a short predetermined time after initial receipt a output square wave for clocking flip-flop 68. Flip-flop 68 produces a $\overline{Q}0$ output for preventing a second flip-flop 70 from being clocked until it is reset and produces a Q output for closing the contacts of channel input switch 72 and the contacts of channel output switch 74 to establish two specific channel paths. One path is for the control information signals from amplifier 78 connected to line 60 through command chip 76 and out through switch 74 to amplifier 80 connected to output line 82. The other established path is for the data information signals on line 62, amplifier 84, switch contacts of switch 72, data chip 86, switch contacts of switch 74, amplifier 88 and the output line 90.

The occurrence of a signal on line 62 after the occurrence of a signal on line 60, however, has no effect on the decision select circuit.

However, if the signal on line 62 precedes the signal on line 60, indicating that it is the one that includes the control information, then delay and waveshaping network 92 will produce an operable clock signal for producing an output from flip-flop 70 for closing both switches 72 and 74 in their respective opposite directions. At the same time, flip-flop 68 is held off until reset occurs. The command path or channel through the RDU now is established with respect to input line 62 and output line 90 and the data channel path is established with respect to lines 60 and 82.

It should be noted that the data chip combines not only the data information being received from previous units in the data chain, but also has connected thereto a connection 94 for receiving local data information originating at the data unit.

Although the preferred embodiment of a source is a light emitting diode, other light sources may also be employed in conjunction with the system just described. Also, the detectors do not have to be optocoupled diodes or transistors, but can be other light detecting means and networks operating therewith for operationally controlling the signals within the unit.

It should be noted that no separate control signals or relays are employed, the direction information and the control and data information all being constructed via light transmission as a unit. Further, electrical interference does not interfere with the connector scheme just described, the alignment of the signals through the system being automatic with the light connections and independent of electrical signals.

Although the system just described has been described in conjunction with a seismic data transmission application, it should be apparent that the scheme is universally applicable to other cable transmission situations. Telephone communications having intermediate data stations can employ cable and station connectors of the type described herein.

While a particular embodiment of the invention has been shown and described, it will be understood that the invention is not limited thereto, since many modifications may be made and will become apparent to those skilled in the art.

What is claimed is:

1. A data transmission apparatus including:
   a data cable comprising a plurality of segments terminated with universal connectors,
   a master station having a mating connector for connection to a connector of a first of said cable segments, and
   a plurality of data stations, each having two data station universal connectors, each of said connectors being suitable for mating with one of said cable segment connectors for respectively connecting said data stations along said data cable,
   direction sensing apparatus, comprising
   a light source included in the connector of said master station,
   a light source and a light detector included in each of said two data station connectors of each of said data stations,
   fiberoptic means included in each of said cable segments to provide a light path for light from said master station light source to a light detector of a first data station connector and subsequent light paths to subsequent sequentially remote data stations from said first data station,
   said light detector in a first of said data station connectors of said first data station connected to said fiberoptic means to detect light from said master station light source, said first data station including logic means operated by said light detector in said first of said data station connectors for establishing separate paths for control and data signals, respectively, through said first data station and for enabling a light source in the second of said data station connectors of said first data station, said path for said control signals being between said light detector in said first of said data station connectors and said light source in said second of said data station connectors, and said path for said data signals being between said light detector in said second of said data station connectors and said light source in said first of said data station connectors, said light detector in the first of said data station connectors in each sequentially subsequent data station connected to said fiberoptic means to detect light sources from respectively preceding data stations, each of said subsequent data stations including logic means operated by said light detector in said respective subsequent data station, for detecting a light source from respectively preceding data stations for establishing separate paths for control and data signals, respectively, through each of said subsequent data stations and enabling said light sources in the second of said data station connectors of each of said respective subsequent data stations and wherein said separate paths through each of said data stations are set concurrently and; the simultaneous, bidirectional transmission of said control and said data signals through each of said data stations can occur.

2. Direction sensing apparatus in accordance with claim 1, wherein each of said data station connectors includes a light emitting diode.

3. Direction sensing apparatus in accordance with claim 1, wherein said data station connectors each has associated therewith:
   at least one optocoupled diode, and
   an active semiconductor network connected to said optocoupled diode, the detection of light by ones of said optocoupled diodes reducing the resistance of said one of said optocoupled diodes and permitting activating current flow in said semiconductor network respectively connected thereto and respectively activating a flip-flop circuit to set said separate paths for said control and said data signals through said data station.

4. Direction sensing apparatus in accordance with claim 1, wherein each of said data stations includes a control channel operated by receiving incoming control information and a data channel operated by receiving incoming data information, and wherein said logic means at each of said data station includes
   means for recognizing a first detected light source by one light detector of said two data station connectors, said first detected light source being recognized as including control information, and
   switching means operated by said recognition means for applying signals from a second detected light source to said data channel.

5. Direction sensing apparatus in accordance with claim 4, wherein said second detected light source detected at said data station includes incoming data information, and wherein said switching means applies said data information to said data channel.

6. Direction sensing apparatus in accordance with claim 4, wherein said switching means includes latching switches at an input terminal and an output terminal of said control channel and other latching switches at an input terminal and an output terminal of said data channel.

7. Direction sensing apparatus in accordance with claim 6, wherein said logic means includes a delay-and-wave shaping network coupled to said respective connector light detectors, said delay-and-wave shaping network coupled to an interacting flip-flop network for producing an output signal to each of said latching switches dependent upon a receipt of a signal from a one of said delay-and-waveshaping networks first to produce a signal.

8. The apparatus of claim 1 wherein said separate paths are established in response to the initial detection by each of said data stations of light and without regard to the information, if any, contained in said initially detected light, and said separate paths may be altered after a reset signal to said logic means in said data stations.

9. A data transmission apparatus including:
   a data cable comprising a plurality of segments terminated with connectors, said cable comprised of a fiberoptic material for transmission of light; and
   a plurality of data stations each having two mating connectors for coupling to said data cable connectors, said data stations arranged in a sequential configuration; said data stations having first processing apparatus for processing a first signal type, said data station having second processing apparatus for processing a second signal type;
   direction sensing apparatus associated with each of said data stations comprising:
   a first light source and a first light detector associated with a first connector;
   a second light source and a second light detector associated with a second connector;
   a first flip-flop coupled to said first light detector;
   a second flip-flop coupled to said second light detector and to said first flip-flop;
   a first switch means responsive to said first and said second flip-flops for coupling said first light detector to only one of said first or said second processing apparatus, and for coupling said second light detector to the other of said first or second processing apparatus not coupled to said first light detector;
   a second switch means response to said first and said second flip-flops for coupling said first light source to only of said first or said second processing apparatus, and for coupling said second light source to the other of said first or second processing apparatus not coupled to said first light source; and
   wherein detection of light by said first light detector prior to detection of light by said second light detector causes said first flip-flop to couple said first light detector to said first light source through said first processing apparatus and causes said first flip-flop to couple said second light detector to said second light source through said second processing apparatus until said first flip-flop is reset, and wherein detection of light by said second light detector prior to detection of light by said first light detector causes said second flip-flop to couple said first light detector to said first light source through said second processing apparatus and causes said second flip-flop to couple said second light detector to said second light source through said first processing apparatus until said second flip-flop is reset, so that separate transmission paths for said first and said second signal types through said first and said second processing apparatus, respectively, are established and so that the simultaneous, bidirectional transmission of said first and said second signal types through each of said data stations can occur.

10. The apparatus of claim 9 wherein said separate path are established without regard to the information, if any, contained in said light first detected by either said first light detector or said second light detector, and said separate paths may be altered after said reset of said flip-flops.

* * * * *